No. 803,608. PATENTED NOV. 7, 1905.
T. H. LEAVITT.
PEAT MACHINE.
APPLICATION FILED MAR. 7, 1904.
2 SHEETS—SHEET 1.
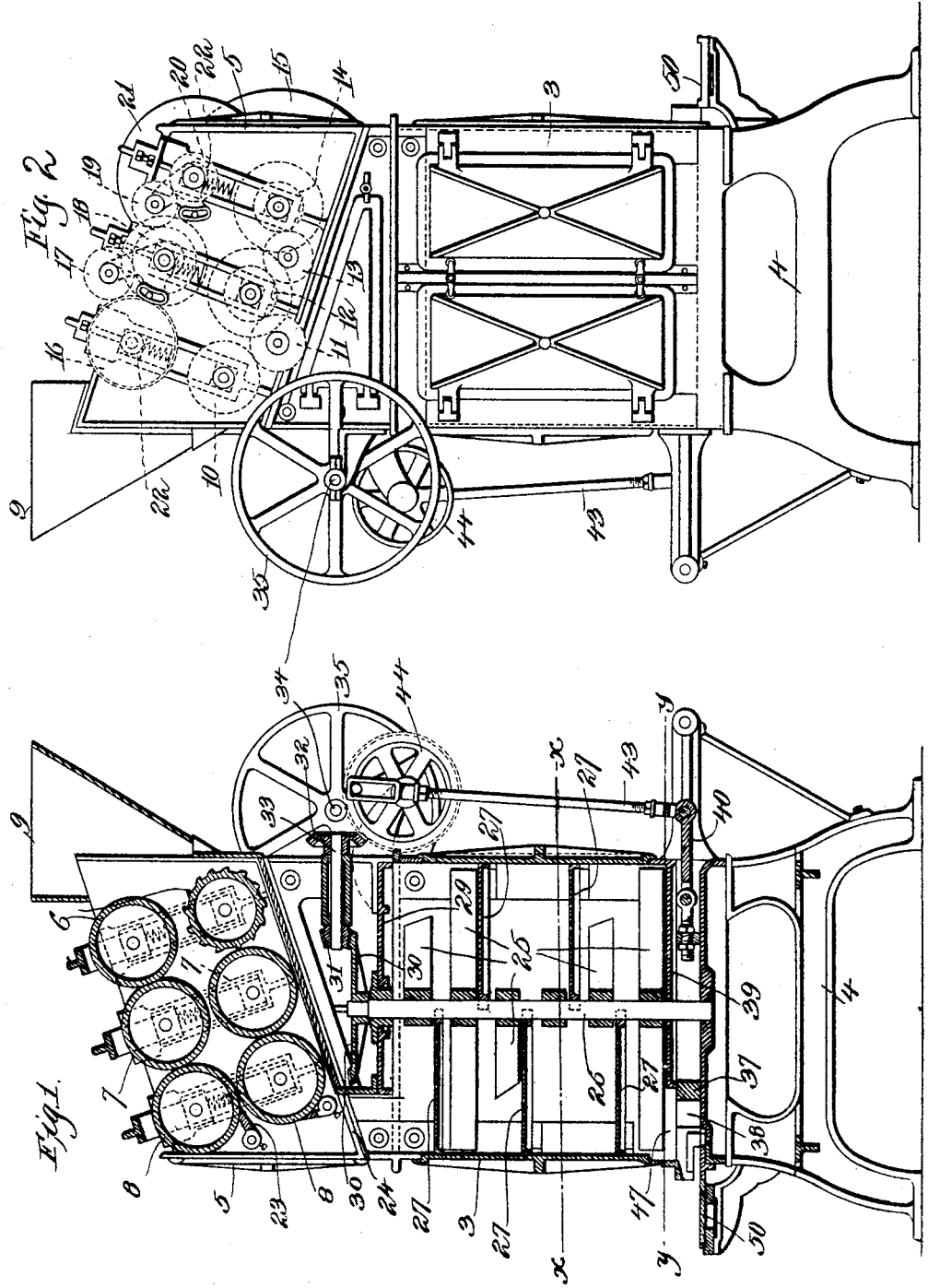
Witnesses.
W. C. Lunsford
A. W. Knapp
Inventor.
Thomas H. Leavitt
By Crosby & Gregory
attys.

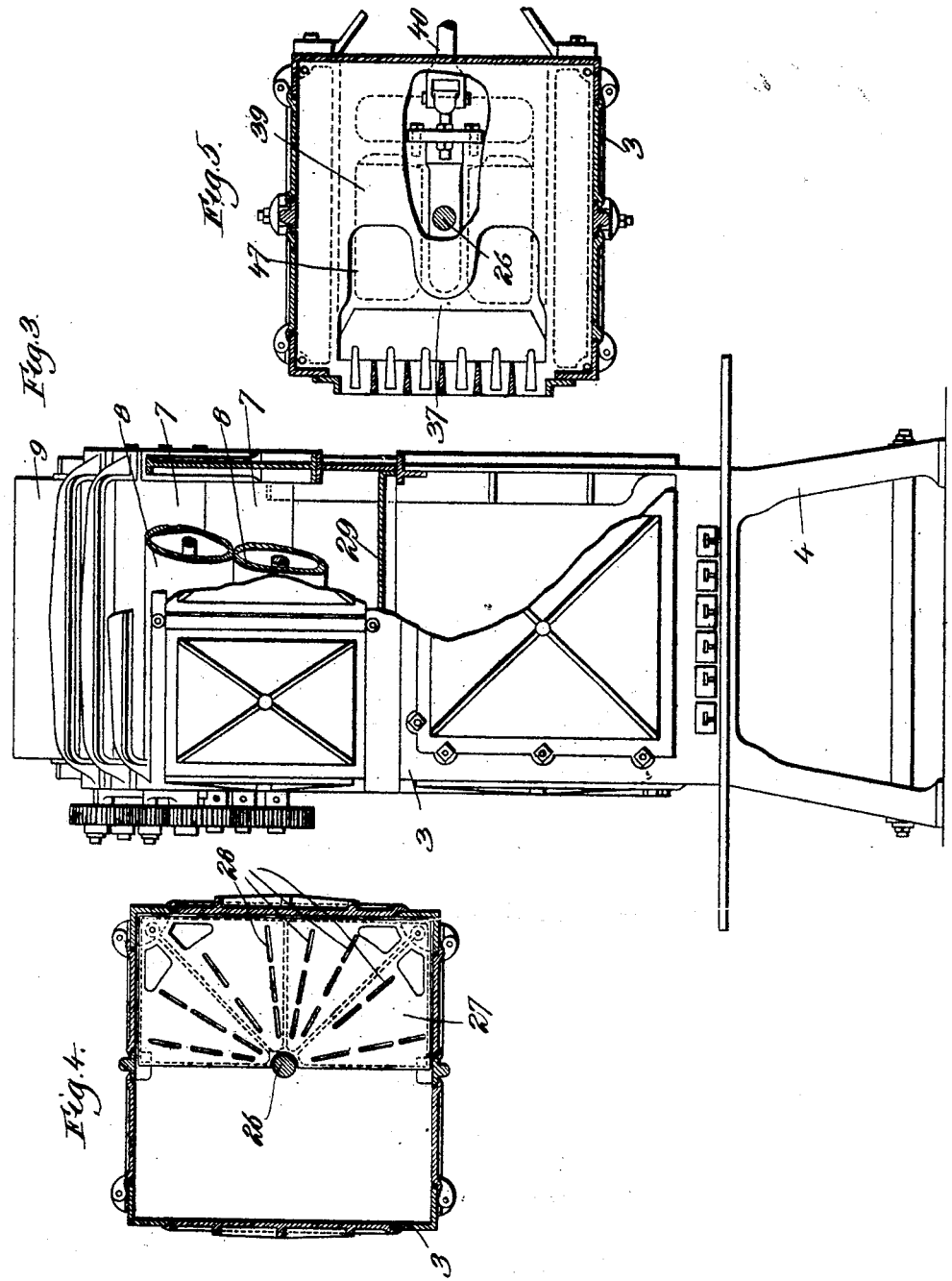

UNITED STATES PATENT OFFICE.

THOMAS H. LEAVITT, OF BOSTON, MASSACHUSETTS.

PEAT-MACHINE.

No. 803,608. Specification of Letters Patent. Patented Nov. 7, 1905.

Application filed March 7, 1904. Serial No. 196,816.

*To all whom it may concern:*

Be it known that I, THOMAS H. LEAVITT, a citizen of the United States, and a resident of Boston, in the county of Suffolk and State of Massachusetts, have invented an Improvement in Peat-Machines, of which the following description, in connection with the accompanying drawings, is a specification, like numerals on the drawings representing like parts.

This invention relates to a novel machine for treating peat and molding it into blocks for fuel.

As is well known, crude peat as it comes from the peat-bog has a more or less cellular structure, the cells of which are filled with water and air. If allowed to dry in the condition in which it is cut from the bog, it will frequently be found to be so friable that it can with difficulty be handled. To overcome this objection and to solidify the peat, it has been attempted to subject the same to pressure; but it has been found that the application of pressure to the peat in its crude or natural condition as taken from the bog seals the cells of the peat still more closely and only results in compressing the air therein without expressing more than a small percentage of the water therefrom.

I have discovered that the proper way to treat crude peat is, first, to break up and destroy the cellular structure of the material, then to eject the air from it and incidentally some of the water, and develop its plastic and adhesive properties, which in its natural state are practically dormant. After these operations it is in condition to be molded into blocks of any desired form and size, which may be dried in any suitable way either in the open air or by artificial means. The product resulting from this treatment is a hard solid fuel, which has structural characteristics entirely different from the crude peat in its natural state as cut or excavated from the bog, which shows when broken a mineral-like structure, and which can never be dissolved and reduced to its original condition. My improved machine for thus treating the peat comprises a plurality of pairs of rubbing-rolls between which the peat is passed, the rolls of each pair preferably being driven at different speeds, so that the peat in passing between them is crushed, the cellular structure of the material is destroyed, and it is prepared for further treatment by rubbing and kneading. The rolls of the successive pairs are arranged progressively nearer together and driven at progressively-increasing speeds, so that after the crude peat has passed between the series of pairs of rolls it has been rubbed into the desired condition and the air partially expelled from the cells thereof. Situated to receive the peat from the rolls is a kneading mechanism which completes the kneading, working, or tempering of the peat and completes the expulsion of the air therefrom. From the kneading mechanism the tempered peat, which is now in a plastic moldable condition, passes to a molding device, which shapes the peat into blocks of the required size.

The process of treating the peat and working it into proper shape as carried out by my machine does not include subjecting the peat to pressure in any way, as the entire working of the peat is done by a rubbing and kneading process. After the blocks of peat have been so treated and dried they have, as before stated, a mineral-like hardness and appearance and break with a fracture not unlike coal or stone and can never be dissolved in water again or reduced to a plastic mass.

In the drawings I have illustrated one form of machine embodying my invention.

Figure 1 designates a vertical central section through my improved machine. Fig. 2 is a side elevation thereof. Fig. 3 is an end elevation, part of the machine being broken away to show the interior construction. Fig. 4 is a section through the casing on the line $x\,x$, Fig. 1. Fig. 5 is a section on the line $y\,y$, Fig. 1.

The machine comprises a casing 3 of any suitable construction, which is preferably mounted on a suitable stand or support 4 and in which is located the kneading mechanism hereinafter described. Situated above the casing or in any other suitable position arranged to discharge the material thereinto is a box or receptacle 5, within which are a plurality of pairs of rubbing-rolls, three such pairs 6 6, 7 7, and 8 8 being illustrated in this form of my invention. At one end of the box or receptacle 5 is a suitable hopper 9, into which the crude peat is fed. The rolls of each pair are driven at different surface speeds, and preferably the rolls of succeeding pairs are different distances apart—for instance, the rolls 7 7 being nearer together than the rolls 6 6 and the rolls 8 8 being nearer together than the rolls 7 7. The rolls 7 are driven faster than the rolls 6 and the rolls 8 still faster than the rolls 7, it being understood that the rolls of each pair are driven at different speeds. I prefer to drive the upper rolls of each pair faster than the lower rolls of the corresponding pair. Any suitable driving mechanism for the rolls may be employed. As herein shown, the bearings of the rolls of each pair project through the side of the receptacle 5 and are journaled in suitable bearings on the outside thereof, and the bottom rolls of the pairs are geared together, so that one is driven from the other, and the top rolls are similarly geared together. The lower roll 6 has on its end a gear 10, meshing with an idler 11, which in turn meshes with a gear 12 on the lower roll 7. This gear 12 meshes with an idler 13, which in turn meshes with a pinion 14 on the end of a roll 8. The roll 8 has applied thereto a driving-pulley 15, through which the lower rolls 6, 7, and 8 are driven through the gearing above described. The gearing is so constructed that said rolls are driven at different speeds, the rolls 8 being driven fastest and the rolls 6 the slowest.

The upper roll 6 has fast thereon a gear 16, meshing with an idler 17, and the latter meshes with a gear 18 on the upper roll 7, which in turn meshes with an idler 19. This latter idler meshes with a gear 20 on the upper roll 8, and said latter roll is driven by a driving-pulley 21 independently of the pulley 15. The gearing connecting these rolls and the speed of rotation of the driving-pulleys 21 and 15 are such as to give the requisite relative speed to the rolls of each pair and to the rolls of successive pairs.

I prefer to yieldingly support the boxes 22, in which the upper rolls of each pair are mounted, in any suitable way, so as to permit the various rolls to give sufficiently to allow any stones or other hard substances in the peat to pass through without injury.

23 designates scrapers which are suitably arranged to clean the surface of the rolls 8.

Immediately beneath the rolls 8 is an aperture 24 in the box 5, through which the peat is discharged into the casing 3, which contains the kneading mechanism. The form of kneading mechanism I prefer comprises a series of blades 25, carried by a vertically-arranged shaft 26 and rotating in proximity to a series of perforated horizontal partitions 27, operating, in effect, like so many spatulas.

The partitions extend only part way across the casing 3, and the successive partitions are located on alternate sides of the casing. The upper partition 27 is situated beneath the aperture 24 and receives the peat discharged from the rolls 8, and the upper blade 25 in its rotation passes over this partition 27 in close proximity thereto and by its inclined position rubs the peat forward between it and said partition, part of the peat being forced down through apertures 28 onto the second partition below and the rest of the peat being carried around and forced from this partition, which extends only half-way across the casing, as shown in Fig. 4, onto the next lower partition. The blade 25 coöperating with this next lower partition similarly acts on the peat, part of the peat being forced through the apertures in the partition and the rest being delivered onto the second partition at the left, Fig. 1. This operation is repeated, and the peat is thoroughly rubbed, kneaded, and worked into a homogeneous mass, the rubbing process resulting in expelling substantially all the air from the peat.

Any suitable mechanism for driving the shaft 26 may be employed. In this form of my invention the upper end of the shaft, which projects through the top 29 of the casing 3, has fast thereon a bevel-gear 30, meshing with a beveled gear 31 on the horizontal shaft 33, said shaft 33 also having thereon another beveled gear 32, which meshes with a beveled gear on the driving-shaft 34. This latter shaft may be driven in any suitable way, as by the driving-pulley 35. When the peat has been worked down through the casing 3 by the above-described kneading mechanism, it passes through a discharge-aperture 47 in the bottom of the casing into a chamber 38 and is forced out of said chamber onto a table 50 by any suitable means, such as a plunger 37. This plunger operates beneath the floor 39 of the casing and is actuated by a toggle-lever mechanism 40, which is connected by a link 43 with a crank-wheel 44, driven from the shaft 34.

In the operation of my machine the crude peat is delivered to the hopper 9 and is passed between the successive pairs of rubbing-rolls. The rolls of each pair give the peat a rubbing action, owing to the difference in their speed of rotation, and as the peat passes from one pair of rolls to the other it is worked and rubbed more and more, with the result that the cellular structure is partially broken up and the air contained in the cells partially expelled. From the rubbing-rolls the partially worked and tempered peat is delivered to the kneading mechanism above described, and the kneading, working, or tempering process is completed, the air completely expelled from the cells, and the peat brought into a plastic homogeneous condition. It will be noted that this entire operation is performed without subjecting the peat to any pressure. This I consider as an important feature of my invention, as it avoids the necessity of expensive heavy machinery for subjecting the peat to pressure.

Various changes in the constructional details of the parts may be made without departing from the invention.

Having described my invention, what I claim as new, and desire to secure by Letters Patent, is—

1. In a peat-machine, means to rub the crude peat, thereby to break up its cellular structure and partially expel the air therefrom, said means including a plurality of pairs of rubbing-rolls, and means to drive positively the rolls of each pair at a different speed, and a kneading mechanism to receive the peat from the rolls and operating to completely expel the air therefrom and develop its plastic properties.

2. In a peat-machine, a plurality of pairs of rubbing-rolls each pair comprising an upper and a lower roll, the rolls of successive pairs being progressively nearer together, means for operatively connecting together the upper rolls of all the pairs, means for connecting together the lower rolls of the pairs, and means for driving the upper rolls of the pairs independently of the lower rolls and at different speeds.

3. In a peat-machine, a plurality of pairs of rubbing-rolls, the rolls of successive pairs being progressively nearer together, means to drive the rolls of any pair at different speeds and the rolls of successive pairs at a progressively-increasing speed, and a kneading mechanism to receive the peat from said rolls said kneading mechanism comprising a plurality of perforated shelves and rotating blades to rub the peat over said shelves.

4. In a peat-machine, means to rub the crude peat thereby to break up its cellular structure and partially expel the air therefrom, said means including a plurality of pairs of rubbing-rolls, and means to drive positively the rolls of each pair at a different speed, combined with a kneading mechanism to receive the peat from the rolls and completely expel the air therefrom and develop its plastic properties, said kneading mechanism comprising a plurality of perforated shelves or partitions, and rotary blades operable in close proximity to said partitions and operating to rub the peat over said partitions.

In testimony whereof I have signed my name to this specification in the presence of two subscribing witnesses.

THOMAS H. LEAVITT.

Witnesses:
   LOUIS C. SMITH,
   WARREN D. OWEN.